United States Patent [19]

Bolognese et al.

[11] Patent Number: 5,729,586
[45] Date of Patent: Mar. 17, 1998

[54] RADIOGRAPHIC CASSETTES AND APPARATUS AND METHOD FOR LOADING/UNLOADING THEREOF

[75] Inventors: Renato Bolognese, Savona; Gian Carlo Pastorino, Mallare; Maurizio Salvadori, Carcare, all of Italy

[73] Assignee: Imation Corp., Oakdale, Minn.

[21] Appl. No.: 791,078

[22] Filed: Jan. 29, 1997

[30] Foreign Application Priority Data

Feb. 1, 1996 [EP] European Pat. Off. ............ 96101382

[51] Int. Cl.$^6$ .................................................. G03B 42/04
[52] U.S. Cl. ........................................ 378/182; 378/188
[58] Field of Search .................................. 378/182–188

[56] References Cited

U.S. PATENT DOCUMENTS

| | | |
|---|---|---|
| 2,895,955 | 7/1959 | Heseltine et al. . |
| 3,323,676 | 6/1967 | Poittevin . |
| 3,423,207 | 1/1969 | Heseltine et al. . |
| 3,504,180 | 3/1970 | Tone . |
| 3,671,648 | 6/1972 | Fumia, Jr. et al. . |
| 3,916,206 | 10/1975 | Koch et al. . |
| 3,968,365 | 7/1976 | Sohngen . |
| 3,987,950 | 10/1976 | Hunt et al. ........................ 378/187 |
| 4,264,821 | 4/1981 | Bauer . |
| 4,346,300 | 8/1982 | Turner . |
| 4,352,198 | 9/1982 | Fukushima et al. . |
| 4,394,772 | 7/1983 | Okamoto et al. ................... 378/182 |
| 4,440,852 | 4/1984 | Onishi et al. . |
| 4,541,173 | 9/1985 | Sakuma et al. . |
| 4,630,297 | 12/1986 | Lerma . |
| 4,760,641 | 8/1988 | Gandolfo . |
| 4,807,271 | 2/1989 | Covington et al. . |
| 5,073,916 | 12/1991 | Mirlieb et al. . |
| 5,282,236 | 1/1994 | Hayes ................................... 378/182 |

FOREIGN PATENT DOCUMENTS

| | | |
|---|---|---|
| 0 026 358 | 4/1981 | European Pat. Off. . |
| 0 276 497 | 8/1988 | European Pat. Off. . |
| 485624 | 5/1938 | United Kingdom . |

OTHER PUBLICATIONS

"Photographic silver halide emulsions, preparations, addenda, processing and systems," Research Disclosure, vol. 176, Dec. 1978, Item 17643, pp. 21–32.

"Photographic silver halide emulsions, preparations, addenda, processing and systems," Research Disclosure, vol. 308, Dec. 1989, Item 308119, pp. 993–1015.

"X-ray film cassettes," Research Disclosure, vol. 183, No. 042, Jul. 1979, Item 18342, pp.376.

Primary Examiner—Craig E. Church
Attorney, Agent, or Firm—William K. Weimer

[57] ABSTRACT

The present invention relates to a radiographic cassette to be used for exposing a radiographic film to X-ray radiation, the radiographic cassette comprising a base element and an upper element, a front phosphor screen adhered to the inner portion of the base element, and a back phosphor screen adhered to the inner portion of the upper element, wherein the radiographic cassette has a hole passing through each of the base and upper element and the front and back phosphor screen, the hole being closed with absorbing means capable to absorb the radiation to which the radiographic film is sensitive. The invention also relates to the apparatus and method for automatically loading/unloading the above radiographic cassette.

8 Claims, 3 Drawing Sheets

RADIOGRAPHIC CASSETTES AND APPARATUS AND METHOD FOR LOADING/ UNLOADING THEREOF

FIELD OF THE INVENTION

The present invention relates to a radiographic cassette to be used in an apparatus for loading/unloading a radiographic film in and from radiographic cassettes. More in particular, the invention relates to a novel radiographic cassette and novel loading/unloading apparatus and method which allows the automatic detection of the loaded/unloaded condition of the radiographic cassette and the automatic activation of the loading/unloading procedure.

BACKGROUND OF THE ART

In radiography, and particularly in medical radiography, light-sensitive elements having silver halide emulsion layers coated on both faces of a transparent support (called double-side coated silver halide elements) are used. The double coated silver halide elements are generally used in combination with fluorescent phosphor screens to reduce the X-ray exposure necessary to obtain the required image. Generally, one fluorescent phosphor screen is used in association with each silver halide emulsion layer of the double coated element. The silver halide emulsions used in the double coated element are sensitized to a region of the electromagnetic spectrum corresponding to the wavelength of the light emitted by the phosphor materials used in the fluorescent phosphor screens, thus obtaining a significant amplification factor.

It is known silver halide radiographic elements are exposed in radiographic cassettes consisting substantially of a base element, generally permeable to X-rays, hinged with an upper element, generally permeable to X-rays, which elements are joined together by a vertical perimetrical element to form a container having an essentially flat parallelepiped shape. The flat horizontal upper and base elements and the vertical element have the minimum dimensions necessary for containing a radiographic film of a certain format disposed between intensifying screens fixed to the inner portion of the upper and base elements. The screens are uniformly pressed against the film to ensure good uniform contact with the film, as known in the art. Radiographic cassettes are described, for example, in U.S. Pat. Nos. 3,323,676, 3,504,180, 4,264,821, 4,352,198, 4,630,297, and European patent application Nos. 18,564 and 26,358

It is known in the art that such radiographic cassettes are loaded with a radiographic film before the exposure to X-rays and are unloaded after the exposure to develop the exposed radiographic film. The loading-unloading operation is nowadays executed in automatic apparatus for the day-light loading and unloading to avoid the manual operation which should be conducted in a dark room. The apparatus for day-light loading and unloading of X-ray film cassettes comprises means for the light-tight housing of unexposed X-ray film feeding magazines, means for the light-tight housing of an exposed X-ray film including or not including radiographic cassettes, means for opening and closing the radiographic cassettes, means for introducing into and taking out an X-ray film from the cassette and means for carrying it from and towards the cassette, means for taking out a film from a feeding magazine and pneumatic or motor-driven actuator means for each or all of the means. An example of such an apparatus is described, for example, in U.S. Pat. No. 4,760,641.

One of the main drawbacks of this type of loading-unloading apparatus relates to the absence of a mechanism to verify the presence or absence of a radiographic film in the cassette. This can cause the insertion of a second radiographic film into a cassette already containing a film (exposed or unexposed) or an attempt to extract a film from an empty cassette, with consequent damages to the phosphor screens of the cassette.

To overcome said drawback, various solutions have been proposed in the art.

U.S. Pat. No. 4,394,772 discloses a radiographic cassette comprising a built-in indicator. The built-in indicator comprises a pair of spaced plates, one of which is provided with a liquid crystal display connected to an electrical circuit powered with a solar battery. When the cassette is empty, the spaced plates are in contact with one another and the electrical circuit is shortened and the liquid crystal display is blank. When the cassette contains a film, the short-circuiting plates are isolated from each other by the film resulting in the liquid crystal indicator displaying the word "film". However, there is no provision for an automatic check within the loading/unloading apparatus and an operator interpretation error is always possible.

U.S. Pat. No. 4,807,271 discloses a radiographic cassette comprising a slidable element which can move from a first position indicating the film absence to a second position indicating the film presence. This solution provides a visual indication to the operator of the presence or absence of film. Again, there is no provision for an automatic check within the loading/unloading apparatus and an operator error is always possible.

U.S. Pat. No. 4,541,173 discloses an automatic film loading/unloading apparatus comprising an infrared light source and an infrared light detector. When the cassette is opened the detector can detect the presence or absence of film on the lower portion of the cassette according to the intensity of reflection from the internal surface of the cassette. The detector automatically actuates the extraction or the insertion of the film as the case may be. The main disadvantage of this system is that a radiographic film may adhere to the inner surface of the upper portion during opening of the cassette due to static charges of the film sheet in surface-to-surface contact with the inner surface of the upper portion of the cassette. In this case, no film sheet is detected in the lower portion of the cassette and a second film could be erroneously put into the cassette.

U.S. Pat. No. 5,073,916 discloses an automatic film loading/unloading apparatus comprising two infrared light sources associated with two infrared light detectors and a mirror system for directing the emitted light towards the upper and lower inner portions of the opened cassette. By comparing the intensity of the light reflected from the two portions of the cassette, the system can detect the film presence (either in the upper or lower portion of the cassette) if the intensity is different, or the film absence, if the intensity is equal. This system can overcome the disadvantages of the above mentioned U.S. Pat. No. 4,541,173, but it is complex and expensive, by requiring two light sources, two detectors, a light intensity comparing device and a mirror system.

The main object of the present invention is to provide a simple and inexpensive solution to the above mentioned disadvantages.

SUMMARY OF THE INVENTION

According to a first embodiment, the present invention relates to a radiographic cassette to be used for exposing a radiographic film to X-ray radiation, the radiographic cassette comprising a base element and an upper element, a front phosphor screen adhered to the inner portion of the base element, and a back phosphor screen adhered to the inner portion of the upper element, wherein the radiographic cassette has a hole passing through each of the base element and upper element and the front and back phosphor screen, the hole being closed with filtering (or absorbing) means capable of absorbing the radiation to which the radiographic film is sensitive.

In a second embodiment, the present invention relates to an automatic film loading/unloading apparatus comprising a radiographic cassette-carrying unit which comprises means for positioning and centering a radiographic cassette, means for opening and closing the radiographic cassette, means for loading a radiographic film into the radiographic cassette, means for unloading a radiographic film from the radiographic cassette, means for detecting the presence or absence of a film in radiographic cassette, and means for appropriately actuating loading or unloading means depending upon the detection of the absence or presence of the radiographic film, wherein the means for detecting the presence or absence of a radiographic film comprises a light emitting device and a light receiving device disposed at opposite sides of the cassette and in axial correspondence of a radiographic cassette hole.

In a third embodiment, the present invention relates to a method for automatically loading/unloading a radiographic cassette within an automatic loading/unloading apparatus comprising a radiographic cassette-carrying unit which comprises means for positioning and centering a radiographic cassette, means for opening and closing the radiographic cassette, means for loading a radiographic film into the radiographic cassette, means for unloading a radiographic film from the radiographic cassette, means for detecting the presence or absence of a film in the radiographic cassette, and means for appropriately actuating loading or unloading means depending upon the detection of the absence or presence of the radiographic film, the method comprising the steps of:

positioning and centering a radiographic cassette into the radiographic cassette-carrying unit, causing a light emitting device to emit radiation to which the radiographic film is not sensitive, directing the radiation through a radiographic cassette hole, causing the radiation striking a light receiving device after passing through the hole and converting the radiation in an electrical signal, processing the electrical signal, and actuating the proper loading or unloading means depending upon the result of the signal processing.

DETAILED DESCRIPTION OF THE INVENTION

Accordingly, the first embodiment of the present invention relates to a radiographic cassette for exposing a radiographic film to X-ray radiation, the radiographic cassette comprising a base element and an upper element, a front phosphor screen adhered to the inner portion of the base element, and a back phosphor screen adhered to the inner portion of the upper element, wherein the radiographic cassette has a hole passing through each of the base element and upper element and the front and back phosphor screen, the hole being closed with absorbing means capable of absorbing the radiation to which the radiographic film is sensitive.

Figure 1:
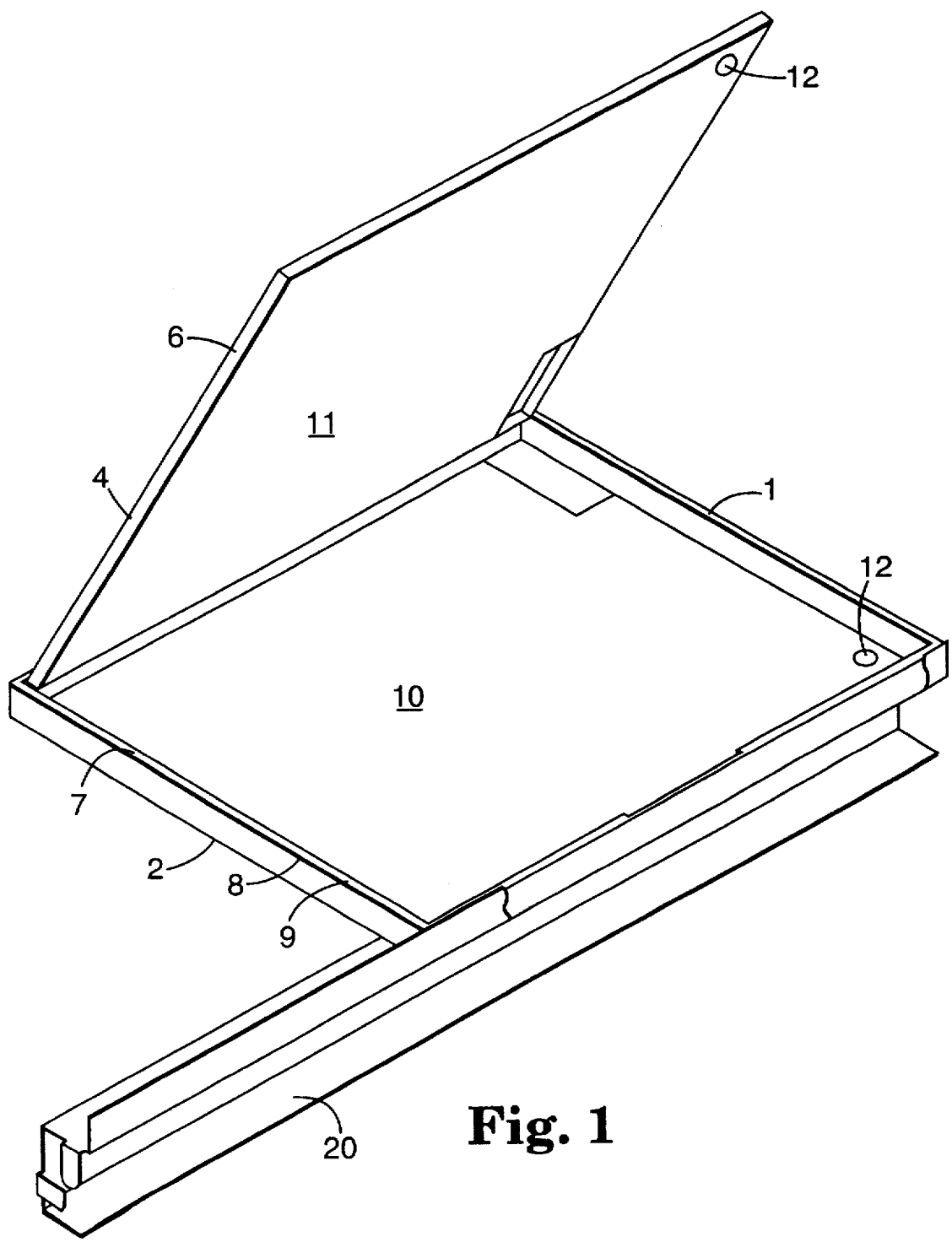
FIG. 1 is a perspective view of the cassette according to the present invention in an open state.
Figure 2:
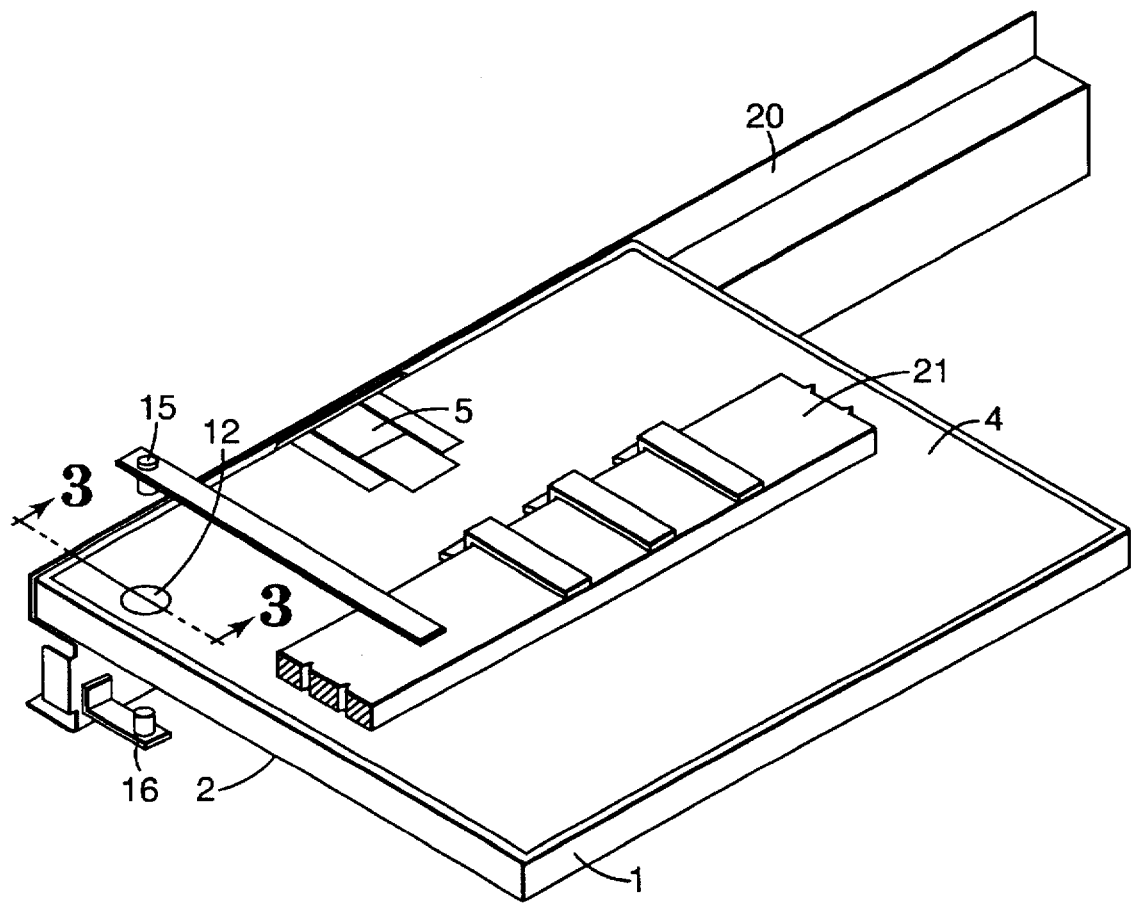
FIG. 2 is a perspective view of the cassette according to the present invention in a closed state.

Referring now to FIGS. 1 and 2, the radiographic cassette 1 of the present invention comprises a base element 2 with an upper element 4. The upper element 4 is engageable with the base element 2 by means of locking pieces 5. The upper element 4 is provided with an outer edge 6 engageable within the perimetrical groove 7 of the base element 2, formed by two perimetrical edges 8 and 9. The inner portions of the base element 2 and the upper element 4 are provided with respective front phosphor screen 10 and back phosphor screen 11.

The radiographic cassette of the present invention is provided with a hole 12. The hole 12 passes through the base element 2, the front phosphor screen 10, the back phosphor screen 11, and the upper element 4 to form a light passage through the entire cassette. The hole can have any suitable diameter allowing the passage of a radiation beam. Preferably, the hole should be as small as possible to avoid accidental exposure of the radiographic film contained in the radiographic cassette. The hole diameter may, for example, range from 0.05 to 1 cm, preferably from 0.1 to 0.5 cm.

Figure 3:
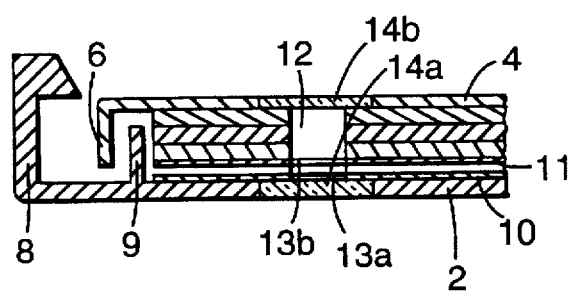
FIG. 3 is a section view of the portion of the cassette provided with a hole.

Referring now to FIG. 3, the portion of the hole passing through the front phosphor screen 10 and the back phosphor screen 11 is provided with a pair of filters 13a and 13b capable of absorbing the radiation to which the radiographic film contained in the cassette is sensitive. Preferably, these filters 13a and 13b should absorb the UV-blue portion of the electromagnetic spectrum, more preferably the UV-blue and green portion of the spectrum, and more preferably visible radiation having wavelength in the range of from 300 to 700 nm. The portion of the hole passing through the base element 2 and the upper element 4 is closed with a pair of transparent covers 14a and 14b to protect the filter from accidental damage. The covers 14a and 14b can be realized by any transparent material, such as, for example, glass, plastic, quartz, and the like. Alternatively, a filter dye capable of absorbing the radiation to which the radiographic film contained in the cassette is sensitive can be added to the cover material to give it the absorbing characteristics described above. In this case, the filters 13a and 13b could be omitted.

The filter dyes must be selected on the basis of their radiation absorbing characteristics to insure that they filter the appropriate wavelengths. Filter dyes are well documented in the literature such as U.S. Pat. Nos. 4,440,852, 3,671,648, 3,423,207, and 2,895,955, GB Pat. No. 485,624, Research Disclosure, Vol. 176, December 1978, Item 17643 and Vol. 308, December 1989, Item 308119. Filter dyes can be used in the practice of the present invention to provide room-light handleability to the radiographic cassette of the present invention when containing a radiographic film.

The radiographic cassette 1 of the present invention is intended to be used in an automatic film loading/unloading apparatus comprising a radiographic cassette-carrying unit which comprises means for positioning and centering a radiographic cassette, means for opening and closing the radiographic cassette, means for loading a radiographic film into the radiographic cassette, means for unloading a radiographic film from the radiographic cassette, means for detecting the presence or absence of a film into the radiographic cassette, and means for appropriately actuating loading or unloading means depending upon the detection of the absence or presence of the radiographic film, wherein the means for detecting the presence or absence of a radiographic film comprises a light emitting device and a light receiving device disposed at the opposite sides of the cassette and in axial correspondence of a radiographic cassette hole.

The term "axial correspondence" means that the light emitting device and the light receiving device disposed at the opposite sides of the cassette are positioned so that light coming from the emitting device will pass through the hole with a direction corresponding to the axis passing through the center of the hole and be received by the receiving device.

Automatic film loading/unloading apparatus are well known in the art. A detailed description of loading/unloading apparatus can be found in U.S. Pat. No 4,760,641 incorporated herein for reference.

Figure 4:
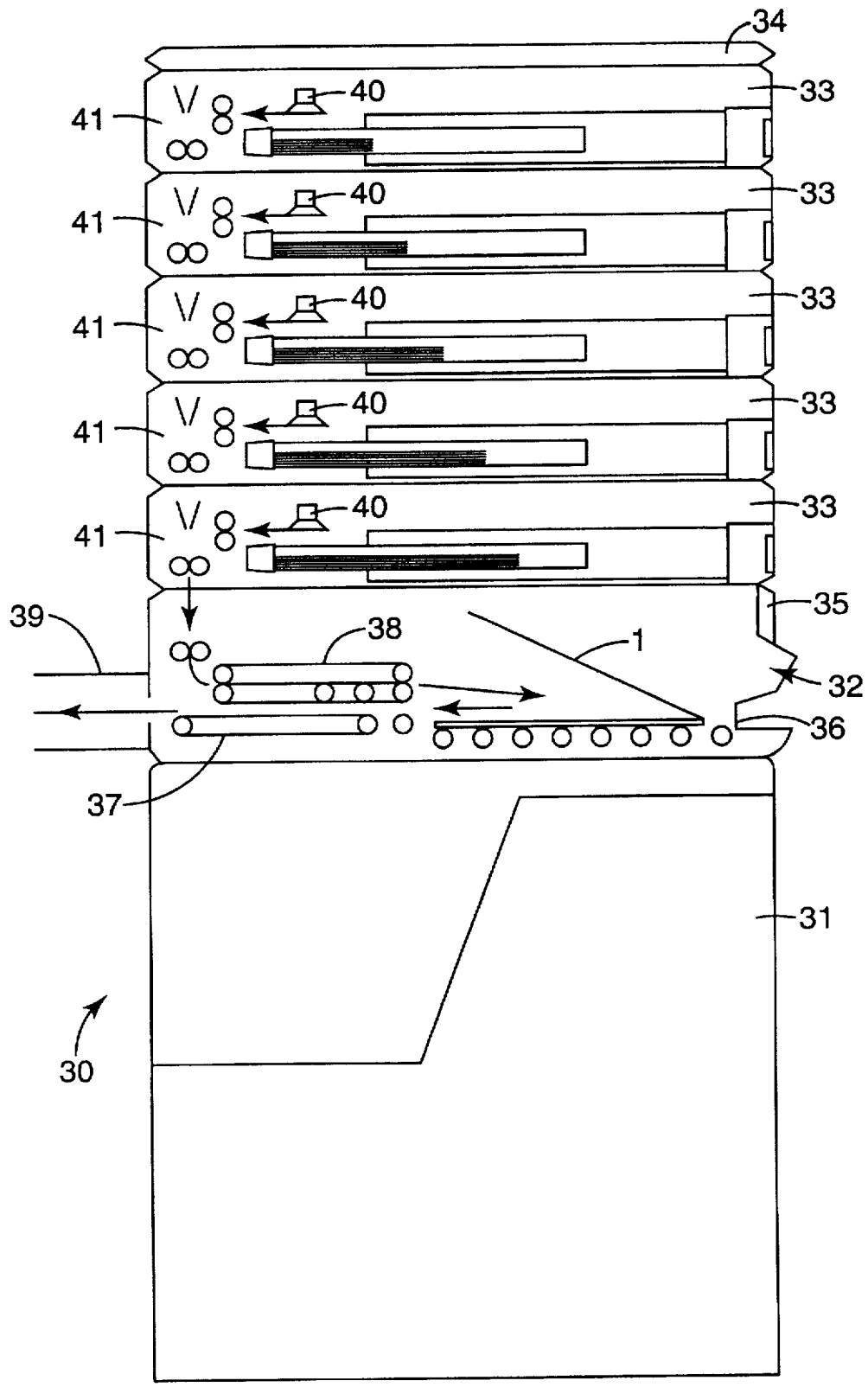
FIG. 4 is a schematic view of the automatic loading/unloading apparatus as a whole.

A schematic embodiment of the loading and unloading apparatus according to the present invention, is shown as a whole in FIG. 4. The apparatus 30 essentially comprises a parallelepiped-shaped ground unit 31, a cassette-carrying unit 32 secured at the top of the ground unit 31, a series of magazine-carrying units 33 (in the illustrated example five magazine-carrying units) placed one on the other above the cassette-carrying unit 32 and a top protecting unit 34 placed on the upper magazine-carrying unit 33. Each unit 31, 32, and 33 has a supporting metallic structure to support the various components of each unit and a protecting light-tight external paneling consisting of molded plastic material component elements.

Ground unit 31 supports the cassette-carrying unit 32 and the magazine-carrying units 33 and embodies pressurized air feeding source and relative valve and distribution means connected with various actuator means of units 32 and 33, as well as most of electrical equipment and relative circuits connected with various position sensors provided also in units 32 and 33 and controlled by an electronic processing and controlling means to operate the apparatus according to programmed operation cycles which can be monitored by means of a programming and controlling panel 35 applied on the front side of the cassette-carrying unit 32. Such conventional processing and controlling means, as well as other pneumatic and electrical components whose major portion is contained inside the ground unit 31, are not shown and, for sake of brevity, are not described in detail.

The cassette-carrying unit 32 is provided with cassette handling means for positioning and centering a radiographic cassette, means for opening and closing the radiographic cassette, means 37 for taking out the exposed X-ray film and carrying it towards the apparatus outlet 39, and means 38 for feeding a new X-ray film coming from one of the magazine-carrying units 33 and for introducing it to the inside of the radiographic cassette. The cassette-carrying unit 32 is also provided with a slot 36 for the insertion of the radiographic cassette 1.

Each magazine-carrying unit 33 comprises magazine handling means for the insertion of a radiographic film feeding magazine, means 40 for grasping and taking out one film at a time, and means 41 for conveying such film towards the cassette-carrying unit 32.

Referring now to FIGS. 1 and 2, there are schematically shown means 20 for positioning and centering the radiographic cassette 1 and means 21 for opening and closing the radiographic cassette 1 provided within the above described cassette-carrying unit 32. The means 21 for opening and closing the radiographic cassette 1 is provided with a light emitting device 15, and the means 20 for positioning and centering the radiographic cassette 1 is provided with a light receiving device 16. The light emitting device 15 and the light receiving device 16 face each other and are disposed at opposite sides of the radiographic cassette. When the radiographic cassette is properly inserted into the cassette-carrying unit 32, the hole 12 is positioned in axial correspondence with and between the light emitting device 15 and the light receiving device 16.

The light emitting device 15 is able to emit a radiation to which a radiographic film contained in the cassette 1 is not sensitive. Preferably, the light emitting device 15 is a light emitting diode emitting infrared radiation having a wavelength in the range of from 700 to 1200 nm. The radiation emission is actuated by a device (not shown) able to detect the presence and the correct positioning of the cassette in the cassette-carrying unit 32. The radiation emission passes through the hole 12 before opening of the radiographic cassette 1 and is detected by the light receiving device 16. The light receiving device 16 is preferably a photodiode able to convert the received light in an electrical signal. The light receiving device 16 is connected to a conventional microprocessor (not shown) which controls the means (37,38) for loading and unloading the radiographic film into or from the radiographic cassette. The activation of the means for loading and unloading the radiographic film is provided by a conventional actuator which is activated by a signal emitted by the microprocessor after the processing of the signal received from the light receiving device 16.

The radiographic cassette is inserted into the cassette-carrying unit 32 through the means for positioning and centering the cassette. Once the cassette is correctly positioned and centered, a sensor provided on the means for positioning and centering the cassette enables the diode 15 to emit light. The emitted light is directed to pass through the cassette hole. The light passed through the cassette hole is directed to strike the photodiode 16. When the radiographic cassette contains a radiographic film, the light emitted by the diode 15 is almost completely absorbed by the radiographic film and the photodiode 16 does not transmit any significant electrical signal (condition 0). When the radiographic cassette is empty, the light by the diode 15 passes through the hole and strikes the photodiode 16, which converts it in an electrical signal (condition 1). The microprocessor connected to the photodiode 16 can detect the above mentioned conditions 0 or 1 and activate the means for unloading the radiographic film present in the cassette or the means for loading a radiographic film into the empty cassette by sending a signal to the proper actuator. As mentioned above, the activation of the means for loading and unloading the radiographic film is provided by a conventional actuator which is activated by the signal emitted by the microprocessor after the processing of the signal received from the light receiving device 16.

The construction details and the embodiments of the present invention can be, of course, varied widely with respect to what is described and illustrated, without falling, however, outside the scope of the present invention.

What is claimed is:

1. A radiographic cassette for exposing a radiographic film to X-ray radiation, said radiographic cassette comprising:

a base element having a base element inner portion;

an upper element having an upper element inner portion;

a front phosphor screen adhered to said base element inner portion;

a back phosphor screen adhered to said upper element inner portion; and means for absorbing the radiation to which said radiographic film is sensitive;

wherein said radiographic cassette has a hole passing through each of said base and upper elements and said front and back phosphor screens, said hole being closed with said absorbing means.

2. The radiographic cassette according to claim 1, wherein said absorbing means is able to absorb UV-blue light.

3. The radiographic cassette according to claim 1, wherein said absorbing means absorbs UV-blue and green light.

4. The radiographic cassette according to claim 1, wherein said absorbing means absorbs visible radiation having a wavelength in the range of from 300 to 700 nm.

5. The radiographic cassette according to claim 1, wherein said absorbing means comprises a pair of filters and a pair of transparent covers.

6. The radiographic cassette according to claim 1, wherein said absorbing means comprises a pair of transparent covers which comprises a filter dye.

7. The radiographic cassette according to claim 1, wherein said hole has a diameter of from 0.05 to 1 cm.

8. The radiographic cassette according to claim 1, wherein said hole has a diameter of from 0.1 to 0.5 cm.

* * * * *